United States Patent Office 2,768,070
Patented Oct. 23, 1956

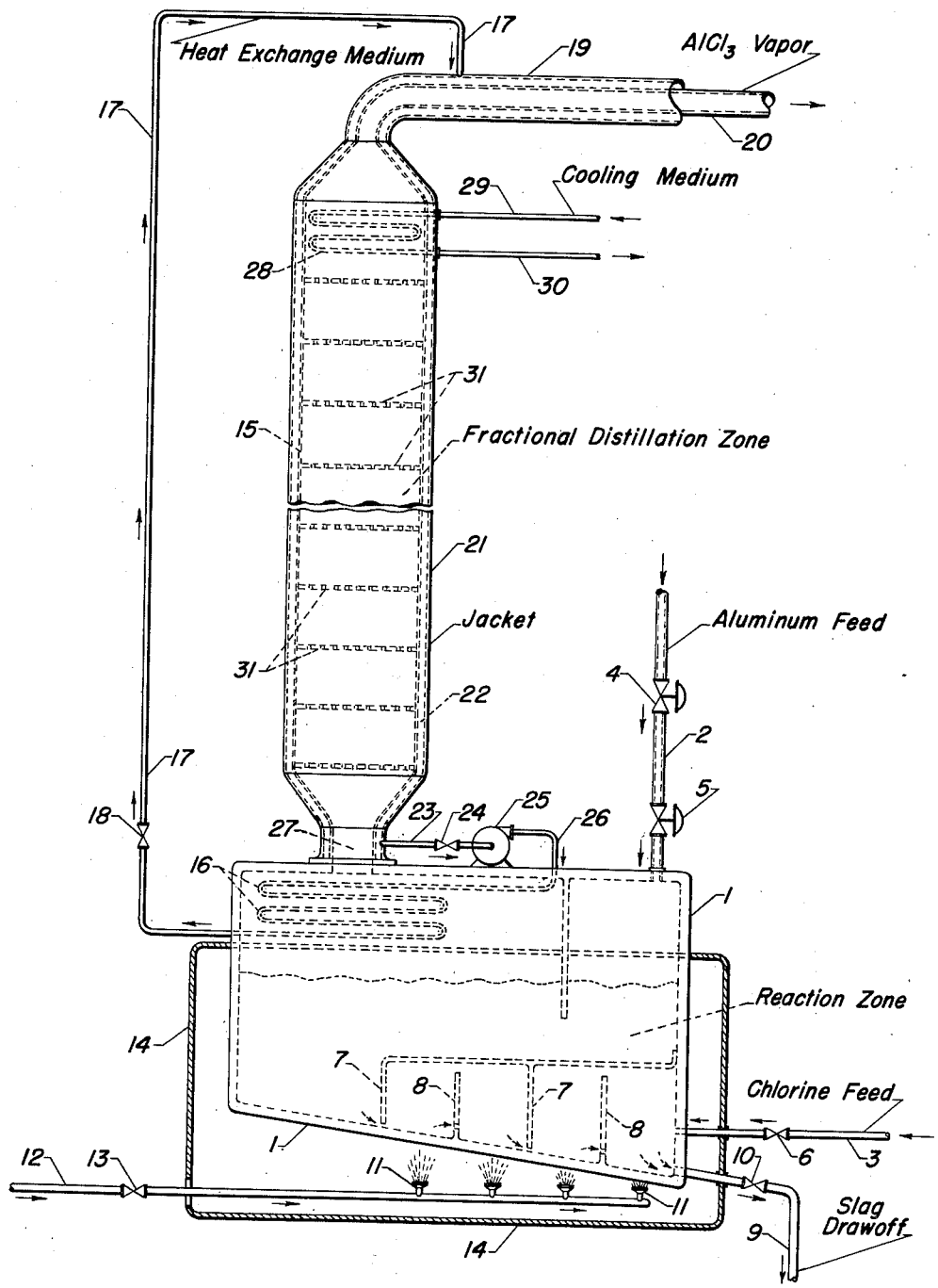

2,768,070

MEANS FOR PREPARING ALUMINUM CHLORIDE

John Brazaitis, Chicago, Ill., assignor to Universal Oil Products Company, Des Plaines, Ill., a corporation of Delaware Application January 26, 1953, Serial No. 333,200

4 Claims. (Cl. 23—263)

This invention relates to means for preparing aluminum chloride and more specifically to a method and apparatus for making substantially pure aluminum chloride which is suitable for use in preparing catalyst.

Aluminum chloride has been found to be a desirable starting material in the preparation of alumina, which finds many uses, including that of a dehydrating agent, contact agent, and catalyst or catalyst component for effecting various organic reactions, etc. However, where alumina is utilized as a catalyst component, it is necessary that it be substantially pure in order to preclude the entrainment or incorporation of contaminating matter or other undesired materials into the catalyst. The present invention provides means for preparing aluminum chloride from technical grade aluminum or a good quality scrap aluminum. In the usual methods of preparation of aluminum chloride, there are various impurities, principally metal chlorides, such as those of iron and silicon, as well as perhaps some zinc and copper and magnesium chlorides. The various impurities may be separated from the aluminum chloride by a sublimation type of separation or by fractional distillation. The latter type of operation must, of course, be carried out under suitable conditions of temperature and pressure that will maintain a vapor-liquid equilibrium and effectively permit fractionation. Aluminum chloride is, however, a sublimable material and the upper portion of the fractionation zone must be maintained under controlled operating conditions to preclude the solidification of aluminum chloride in the upper portion thereof.

It is a principal object of the present invention to provide an improved processing arrangement such that aluminum chloride may be prepared from aluminum in a substantially pure form suitable for use in catalyst compositions.

It is a further provision of the present invention to provide a compact combined arrangement of reaction and distillation zones forming a unitary apparatus.

It is a still further object of the invention to provide an operation and apparatus arrangement which permits the utilization of the exothermic heat of reaction in the formation of aluminum chloride for heating both a reaction zone and the fractional distillation zone so that the latter is maintained under substantially adiabatic conditions.

Briefly, the present invention provides an improved combined method for preparing a substantially pure aluminum chloride in a manner which comprises, introducing aluminum into a heated reaction zone and maintaining molten aluminum therein, passing chlorine through and into contact with the molten aluminum and forming aluminum chloride, passing a resulting vaporous aluminum chloride stream into indirect heat exchange with a suitable fluid heat exchange medium whereby to heat the latter and remove heat from the vaporous aluminum chloride stream, passing the latter into a fractional distillation zone and maintaining and effecting the fractionation of said stream while maintaining the latter zone substantially adiabatic by passing the heated fluid medium is indirect heat exchange therewith, and drawing a substantially pure aluminum chloride vapor from the distillation zone.

Certain of the contaminating chlorides, such as iron chloride, have a higher boiling point than that of the aluminum chloride and will remain for the most part within the reaction zone. Other chlorides which individually have a lower boiling point than aluminum chloride, may combine or form mixtures which can be separated at superatmospheric pressures, and it is, therefore, desirable to operate under pressure within the reaction zone and the fractionation zone in order to aid in the purification of aluminum chloride by a distillation operation. The present operation is preferably carried out under superatmospheric conditions of at least about 3 atmospheres, and of course, as hereinbefore set forth briefly, the operating temperature within the fractionation zone must be maintained to provide a vapor-liquid operation and at the same time preclude the solidification of any of the aluminum chloride vapor within the top of the zone. Suitable cooling means may be used to form some condensate for reflux at the top of the column.

The improved apparatus arrangement of the present invention provides for directly superimposing the fractional distillation zone adjacent to and above the aluminum chloride reaction zone so that the aluminum chloride vapors may be passed directly to the fractionation zone for purification. A particular feature of the improved arrangement also provides a heat exchange coil within the upper vapor portion of the reaction zone such that resulting aluminum chloride vapors may be cooled prior to introduction into the fractional distillation zone while at the same time a heat exchange medium may absorb heat to be in turn released at the fractionation zone. A preferred embodiment provides a spaced jacket around the fractionation zone such that the heat exchange medium may flow in indirect heat exchange relationship therewith and maintain the zone under substantially constant adiabatic conditions.

The formation of aluminum chloride by passing the chlorine into contact with the molten aluminum is a highly exothermic reaction and under normal operating conditions the resulting exothermic heat may be utilized to continuously melt aluminum charged to the zone. Burner means may, however, be provided in conjunction with the reaction zone to provide heat for initially melting the aluminum charge and providing molten aluminum for reacting with the chlorine reactant stream.

In the fractional distillation zone itself, particularly for large size units, bubble decks or perforate trays or the like may be utilized, while for smaller units a suitable packing material may be used. Further, aluminum rings are preferably used as a packing material in the fractionation zone to effect a desirable efficient fractional distillation and purification of the aluminum chloride stream.

Reference to the accompanying drawing, and the following description thereof will serve to clarify the improved operation and advantageous features of the compact apparatus arrangement provided by the present invention.

Referring now to the drawing, there is shown a reaction chamber 1 having an upper aluminum charge inlet or feed conduit 2 and a lower chlorine feed conduit 3, the latter placed so that the chlorine will react with molten aluminum within the lower portion of the chamber. The aluminum feed conduit 2 is provided with a double valve arrangement, such as the valves 4 and 5, although a suitable screw feeder or the like may be utilized to permit introducing aluminum into a pressure zone. The rate of introduction of the chlorine feed stream is controlled by a suitable valve 6 in the conduit 3.

Because of the high temperature conditions within the reaction zone 1, the latter is constructed of a suitable high temperature resistant refractory material. Also, in a preferable construction or arrangement of the reaction zone, the lower portion thereof is formed into a baffled zone by means of suitable staggered baffle members, such as 7 and 8, whereby the chlorine stream passes in a tortuous elongated path through the molten aluminum. The lower portion of the reaction zone is provided with a slanting floor arrangement such that slag may be drawn off from a low point of the zone by means of conduit 9 and valve 10. For starting up purposes, a plurality of burners 11, or other heating means, may be used in conjunction with the exterior of the reaction chamber 1 so that the aluminum feed to the unit may be maintained in a molten state. As hereinbefore set forth, the formation of the aluminum chloride is highly exothermic and after the unit is once in operation, the added aluminum will be continuously melted and molten aluminum maintained by the heat of extraction. The present drawing is diagrammatic only in indicating burners 11 with a fuel supply conduit 12 and control means 13, as well as suitable jacketing means 14 enclosing the burners and lower portion of the reaction chamber 1.

The upper portion of the reaction chamber is utilized as an aluminum chloride vapor cooling and heat exchange zone. Resulting aluminum chloride vapors leave the molten aluminum at a high temperature of the order of about 660° C. and are subsequently passed through the vapor collection and cooling zone to a superimposed fractional distillation zone provided by chamber 15. However, the aluminum chloride vapors first pass in indirect heat exchange relationship with a heat exchange coil 16 within the upper portion of the reaction chamber in a manner effecting a substantial cooling of the aluminum chloride and the heating of a suitable heat exchange medium passing through coil 16. Preferably, Dowtherm or a heat exchange medium which is suitable for withstanding high temperature circulation is utilized within the heating coil 16 and the closed circulation system around the distillation chamber 15.

The present drawing indicates diagrammatically the Dowtherm or other heat exchange medium being discharged from the coil 16 by way of conduit 17 and control valve 18 and passing into a jacketed space 19 around a vapor outlet conduit 20. A jacket 21 is provided around the distillation chamber 15 and spaced from the latter to permit the circulation of the heat exchange fluid around the entire distillation zone to in turn provide the desired controlled heating of the latter. The jacketed space 22 for the heat exchange medium is continuous throughout the height of the column 15 and further extends down to the juncture of the latter with the upper portion of the reaction chamber 1. However, conduit 23 and control valve 24 connecting with the intake of a circulation pump 25 provide for the continuous withdrawal of the heat exchange medium from the space around the distillation zone whereby it may be returned by way of conduit 26 to the heat exchange coil 16. By operating in this manner, resulting aluminum chloride vapors passing from the reaction zone to the distillation zone, by way of passageway 27 are cooled prior to their introduction thereto. The extent of cooling may vary somewhat in accordance with the particular impurities which are present in the aluminum chloride vapor stream. The distillation column itself is, of course, preferably operated substantially adiabatically as hereinbefore set forth, and this being accomplished by the improved arrangement providing for the circulation of hot heat exchange medium around the distillation zone. In order to prevent plugging of the upper aluminum chloride vapor outlet line 20 by the solidification of aluminum chloride, there must also be sufficient heat at the upper end of the column 15 to maintain the passage of vapors to a suitable cooling and collection zone. The present apparatus arrangement indicates a separate cooling coil 28, having inlet and outlet lines 29 and 30 respectively such that there may be formed some liquid for reflux purposes in the upper portion of the fractional distillation zone. The present drawing also indicates, diagrammatically, decks 31 spaced throughout the height of the fractional distillation column. However, as hereinbefore noted, aluminum pellets or rings, or other suitable packing material may well be utilized within the distillation zone.

In effecting this type of operation, normally the heavier metal chlorides, including ferric chlorides, and perhaps some free iron may be withdrawn from the lower portion of the extraction zone by way of the slag draw-off line. Other of the heavier chlorides will be maintained within the reaction zone or separated out within the lower portion of the fractional distillation chamber 15 with but a minimum of very light contaminating chlorides going overhead with the aluminum chloride stream. In this way a substantially pure aluminum chloride may be recovered in a continuously operating compact unitary arrangement.

I claim as my invention:

1. A unitary apparatus for producing aluminum chloride which comprises in combination, an enclosed reaction chamber having an aluminum feed inlet, a chlorine inlet, and an upper aluminum chloride vapor outlet, heating means adjacent the lower portion of said reaction chamber suitable for maintaining molten aluminum therein, a superimposed confined fractionation column connecting directly with said aluminum chloride vapor outlet, a vapor outlet from the upper portion of said fractionation column, spaced jacketing means around said fractionation column and around said vapor outlet therefrom, a heat exchange coil within the upper portion of said reaction chamber directly below the aluminum chloride vapor outlet therefrom, conduit means connecting said heat exchange coil with said jacketing means around said vapor outlet and said fractionation column, and additional conduit means connecting the lower portion of the jacketing means around said fractionation column with said heat exchange coil.

2. The apparatus of claim 1 further characterized in that baffling members are positioned across the interior of said reaction chamber downstream from said chlorine inlet.

3. An apparatus for producing aluminum chloride comprising a reaction chamber having an aluminum inlet and a chlorine inlet, means for heating the chamber to maintain molten aluminum therein, an outlet for aluminum chloride vapors at the upper portion of the chamber, a fractionating column superimposed upon the reaction chamber and directly connected to said outlet, a jacket around said column, a heat exchange coil in the upper portion of the chamber directly below said outlet, conduit means connecting opposite ends of said coil with said jacket at spaced points of the latter, and a vapor outlet at the upper portion of the fractionating column.

4. An apparatus for producing aluminum chloride comprising a reaction chamber having an aluminum inlet and a chlorine inlet, means for heating the chamber to maintain molten aluminum therein, an outlet for aluminum chloride vapors at the upper portion of the chamber, a fractionating column superimposed upon the reaction chamber and directly connected to said outlet, a jacket around said column, a heat exchange coil in the upper portion of the chamber directly below said outlet, a conduit connecting one end of said coil with the upper portion of said jacket, a conduit connecting the lower portion of the jacket with the other end of said coil, and a vapor outlet at the upper portion of the fractionating column.

References Cited in the file of this patent

UNITED STATES PATENTS

| | | |
|---|---|---|
| 1,445,082 | Jacobson | Feb. 13, 1923 |
| 1,474,479 | Jacobson | Nov. 20, 1923 |
| 1,647,446 | Walcott | Nov. 1, 1927 |
| 1,734,200 | Burley | Nov. 5, 1929 |
| 2,018,049 | Allen | Oct. 22, 1935 |
| 2,123,766 | Calcott | July 12, 1938 |
| 2,343,646 | Dinley | Mar. 7, 1944 |
| 2,387,228 | Arnold | Oct. 23, 1945 |
| 2,387,479 | Todd | Oct. 23, 1945 |
| 2,594,370 | Warburton | Apr. 29, 1952 |